(12) United States Patent
Kokubo et al.

(10) Patent No.: US 11,045,896 B2
(45) Date of Patent: Jun. 29, 2021

(54) ELECTRIC RESISTANCE WELDED STEEL PIPE HAVING IDENTIFIABLE SEAM PORTION AND METHOD FOR MANUFACTURING THE SAME

(71) Applicant: JFE STEEL CORPORATION, Tokyo (JP)

(72) Inventors: Shinsaku Kokubo, Handa (JP); Kenichi Iwazaki, Ichihara (JP); Hiromichi Hori, Handa (JP)

(73) Assignee: JFE STEEL CORPORATION, Tokyo (JP)

( * ) Notice: Subject to any disclaimer, the term of this patent is extended or adjusted under 35 U.S.C. 154(b) by 142 days.

(21) Appl. No.: 16/403,731

(22) Filed: May 6, 2019

(65) Prior Publication Data

US 2019/0255646 A1 Aug. 22, 2019

Related U.S. Application Data

(62) Division of application No. 15/555,401, filed as application No. PCT/JP2016/001098 on Mar. 1, 2016, now Pat. No. 10,369,655.

(30) Foreign Application Priority Data

Mar. 3, 2015 (JP) ................................. 2015-040928

(51) Int. Cl.
*B23K 11/36* (2006.01)
*B21C 37/08* (2006.01)
(Continued)

(52) U.S. Cl.
CPC ................ *B23K 11/36* (2013.01); *B21C 1/24* (2013.01); *B21C 37/08* (2013.01); *B21C 37/30* (2013.01);
(Continued)

(58) Field of Classification Search
CPC ........... B21C 1/24; B21C 37/08; B21C 37/30; B23K 11/36; B23K 11/0873; B23K 31/10;
(Continued)

(56) References Cited

U.S. PATENT DOCUMENTS 2,139,771 A * 12/1938 Riemenschneider ... B21C 37/08
219/60 R
3,716,908 A 2/1973 Rowell
(Continued)

FOREIGN PATENT DOCUMENTS

CN 101148012 A 3/2008
JP S54-118372 A 9/1979
(Continued)

OTHER PUBLICATIONS

Machine Translation for JPS6393424-A (Year: 1988).*
(Continued)

*Primary Examiner* — Christopher J Besler
*Assistant Examiner* — Christine Bersabal
(74) *Attorney, Agent, or Firm* — Oliff PLC

(57) ABSTRACT

A method for manufacturing an electric resistance welded steel pipe having an identifiable seam portion. The method includes electric resistance welding a steel pipe, cutting an inner surface bead and an outer surface bead of the steel pipe in such a manner so as to cut: (i) a whole the outer surface bead and a part of the inner surface bead to leave an uncut portion in the inner surface bead, or (ii) a whole of the inner surface bead and a part of the outer surface bead to leave an uncut portion in the outer surface bead, coating the steel pipe with zinc phosphate, and cold drawing the steel pipe using a plug and a die to make the seam portion of the steel pipe identifiable.

7 Claims, 1 Drawing Sheet

(51) Int. Cl.
  *B21C 37/30* (2006.01)
  *F16L 9/16* (2006.01)
  *B21C 1/24* (2006.01)
  *B23K 11/087* (2006.01)
  *B23K 31/10* (2006.01)
  *F16L 9/17* (2006.01)
  *C23C 22/12* (2006.01)
  *C21D 9/08* (2006.01)

(52) U.S. Cl.
  CPC .......... *B23K 11/0873* (2013.01); *B23K 31/10* (2013.01); *F16L 9/165* (2013.01); *F16L 9/17* (2013.01); *C21D 9/08* (2013.01); *C23C 22/12* (2013.01)

(58) Field of Classification Search
  CPC . C21D 9/08; C23C 22/12; F16L 9/165; F16L 9/17
  See application file for complete search history.

(56) References Cited

U.S. PATENT DOCUMENTS

| | | | | |
|---|---|---|---|---|
| 5,604,040 | A | * | 2/1997 | Sugama ................. C23C 22/12 148/251 |
| 7,157,672 | B2 | * | 1/2007 | Gandy .................... B21C 37/08 138/171 |
| 2011/0083512 | A1 | | 4/2011 | Imbert et al. |

FOREIGN PATENT DOCUMENTS

| | | | | |
|---|---|---|---|---|
| JP | S63-93424 | A | | 4/1988 |
| JP | S6393424 | A * | 4/1988 | ............. B21C 37/30 |
| JP | 04197513 | A * | 7/1992 | ............... B21C 1/22 |
| JP | H04-197513 | A | | 7/1992 |
| JP | 2005-125385 | A | | 5/2005 |
| JP | 2012-040581 | A | | 3/2012 |
| JP | 2015074007 | A | | 4/2015 |
| JP | 2015-168003 | A | | 9/2015 |

OTHER PUBLICATIONS

Machine Translation for JP-04197513-A (Year: 1992).*
Apr. 12, 2019 Notice of Allowance issued in U.S. Appl. No. 15/555,401.
May 10, 2016 Search Report issued in International Patent Application No. PCT/JP2016/001098.
Jul. 4, 2017 Office Action issued in Japanese Patent Application No. 2016-533677.
Jul. 2, 2018 Office Action issued in Chinese Patent Application No. 201680013025.2.
Aug. 20, 2018 Office Action issued in Korean Application No. 10-2017-7023827.

* cited by examiner

ELECTRIC RESISTANCE WELDED STEEL PIPE HAVING IDENTIFIABLE SEAM PORTION AND METHOD FOR MANUFACTURING THE SAME

CROSS-REFERENCE TO RELATED APPLICATIONS

The present application is a Division of U.S. application Ser. No. 15/555,401 filed Sep. 1, 2017, which in turn is a national stage entry of PCT/JP2016/001098 filed Mar. 1, 2016, which claims priority of Japanese Patent Application No. 2015-040928, filed Mar. 3, 2015. The disclosure of each of the prior applications is hereby incorporated by reference herein in its entirety.

TECHNICAL FIELD

The present invention relates to an electric resistance welded steel pipe having an identifiable seam portion such that a seam portion, which is a joint portion formed by electric resistance welding, can be identified in a final product, and a method for manufacturing the same.

BACKGROUND ART

The pipe making process for manufacturing an electric resistance welded steel pipe (hereinafter referred to as "electric resistance welded pipe making process") includes, for example, as shown in FIG. 3, a series of steps of rounding a steel strip 1 in a width direction by roll forming 2 while continuously feeding the steel strip, joining both ends of the rounded steel strip in the width direction by electric resistance welding 3 to make a steel pipe 4, and performing an outer surface bead cutting 6 of cutting and removing an outer surface bead that is a swelling formed on the pipe outer surface side of a seam portion 5 that is the joined portion. In some cases, in combination with the outer surface bead cutting 6, inner surface bead cutting 7 is performed to cut and remove an inner surface bead that is a swelling formed on the pipe of the outer surface side of the seam portion 5. The combination of the outer surface bead cutting 6 and the inner surface bead cutting 7 is referred to as the inner and outer surface bead cutting.

When an electric resistance welded steel pipe is subjected to secondary processing, such as plastic working of bending and the like, or welding of its pipe outer surface and an end of a separately prepared plate along the pipe length direction, the electric resistance welded steel pipe is often required to be processed with the seam portion disposed at the optimum position adapted to each processing form. A steel pipe 4 for such secondary processing is desired to have a seam portion that can be identified at a processing site.

In general, identification of the seam portion is performed visually or magnetically. However, these have the following drawbacks.

That is, in the identification by visual observation, because the electric resistance welded portion in the state as formed is darkened compared to the other portion owing to oxidation, this dark portion can be identified as the seam portion. However, by undergoing heat treatment such as tempering after pipe making, the entire surface of the pipe body is darkened, and the identification of the seam portion becomes impossible. Further, an outer surface portion of the seam portion that is subjected to the outer surface bead cutting is depressed compared to the other outer surface portion, and this depression is recognizable even after heat treatment. Therefore, after heat treatment, the depression can be recognized and identified to be the seam portion. However, after the pipe is drawn, the outer peripheral shape of the pipe body is uniformized, and the depression becomes unrecognizable, and the identification of the seam portion after pipe drawing becomes impossible.

Further, in the identification by magnetism, because there is a magnetic characteristic difference due to a difference in metallographic structure between the seam portion in the state as formed and the other portion, the seam portion can be identified by detecting the magnetic characteristic difference. However, by undergoing heat treatment such as temper after pipe making, the difference in the metallographic structure disappears, therefore the magnetic characteristic difference becomes undetectable, and the identification of the seam portion becomes impossible.

On the other hand, as a conventional technique that makes the seam portion recognizable by other means, there is proposed a method (for convenience, referred to as conventional method) in which, for example, a rolling tool is pressed against a cut surface formed by cutting and removing a bead on the pipe outer surface side of the seam portion, and an uneven processed portion is formed (see Patent Literature 1).

According to the conventional method, owing to the rolling tool, the uneven processed portion remains without disappearing even after annealing or after pipe drawing. Therefore, using this as a mark, the seam portion can be easily identified at the secondary processing site.

CITATION LIST

Patent Literature

Patent Literature 1: Japanese Unexamined Patent Application Publication No. 2012-40581

SUMMARY OF INVENTION

Technical Problem

However, in the conventional method, since an uneven processed portion is formed on the cut surface formed by subjecting the seam portion to the outer surface bead cutting, there is a problem (adverse effects to the inspection process after pipe making) in that, when carrying out the pipe length direction ECT flaw detection, in which flaws (defects) are find out, along the pipe longitudinal direction of the steel pipe as a flaw detection direction, by eddy current testing (hereinafter abbreviated as ECT) which is a non-destructive inspection method generally used in a downstream inspection process, the uneven processed portion that is interfering with the seam portion is erroneously detected as a flaw, and the flaw detection accuracy is deteriorated.

In addition, in the conventional method, by the pressing of the rolling tool against the cut surface on the pipe outer surface side, the pipe body is deflected or flattened. On the other hand, in the electric resistance welded pipe making process, in some cases, the inner surface bead cutting is performed in combination with the outer surface bead cutting. In this case, there is a problem (adverse effects on the electric resistance welded pipe making process) in that, when the pipe body is deflected or flattened by pressing the rolling tool against it, a cutting tool used for the inner surface bead cutting and the pipe inner surface excessively interfere with each other, and excessive thickness reduction or damage to the cutting tool is caused.

In view of the problems of the conventional method described above, an object of the present invention is to provide an electric resistance welded steel pipe having an identifiable seam portion and a method for manufacturing the same that have no adverse effects on the electric resistance welded pipe making process and no adverse effects on the inspection process after pipe making, and generates, in the cold drawing performed thereafter, color difference between the bead cut portion and the other portion to make the seam portion identifiable.

Solution to Problem

The present invention made to solve the above problems is as follows.

(1) An electric resistance welded steel pipe includes a steel pipe portion having a seam portion formed by electric resistance welding, and a coating portion of zinc phosphate covering at least the outer surface side of the steel pipe portion. A part of the coating portion that is immediately above the seam portion and has a width W along a pipe circumferential direction of greater than or equal to 0.1 times the wall thickness and less than or equal to a wall thickness is a color difference portion having a visually identifiable color difference from the other portion.

(2) A method for manufacturing the electric resistance welded steel pipe having an identifiable seam portion according to (1) includes rounding a steel strip in a width direction by roll forming while continuously feeding the steel strip, joining both ends of the rounded steel strip in the width direction by electric resistance welding to make a steel pipe having a seam portion formed by the joining; cutting an inner surface bead and an outer surface bead of the steel pipe; applying coating of zinc phosphate to at least an outer surface of the steel pipe; and subjecting the steel pipe to cold drawing using a plug and a die. The cutting of the inner surface bead and the outer surface bead is performed in such a manner as to cut a whole of the outer surface bead and a part of the inner surface bead to leave an uncut portion in the inner surface bead, or a whole of the inner surface bead and a part of the outer surface bead to leave an uncut portion in the outer surface bead so that a protrusion of the uncut portion has a protrusion height h of greater than or equal to 0.07 times and less than or equal to 1.7 times a wall thickness t of a non-bead portion of the steel pipe.

Advantageous Effects of Invention

According to the present invention, since the pressing of the rolling tool is not performed, there are no adverse effects on the electric resistance welded pipe making process and no adverse effects on the inspection process after pipe making, color difference of the coating that is visible from the pipe outer surface side appears between the bead cut portion and the other portion of the steel pipe after the cold drawing, and it becomes possible to easily identify the seam portion visually.

DESCRIPTION OF EMBODIMENTS

Figure 1:
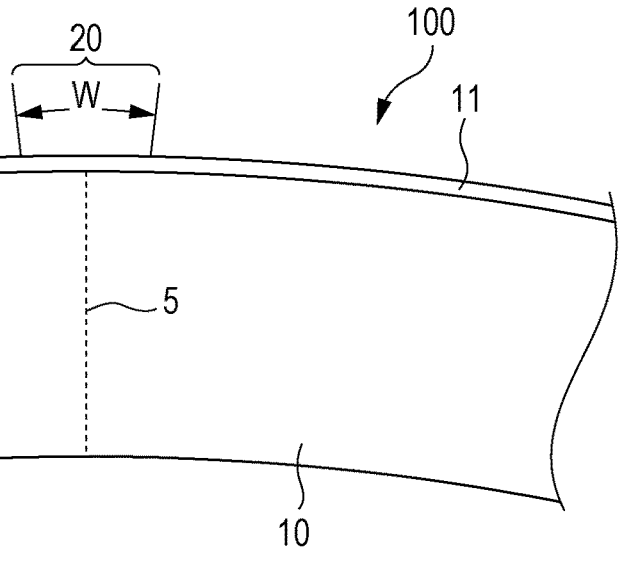
FIG. 1 is a schematic sectional view of the vicinity of a seam portion showing an example of an electric resistance welded steel pipe having an identifiable seam portion according to the present invention.

For example, as shown in FIG. 1, an electric resistance welded steel pipe 100 having an identifiable seam portion according to the present invention has a steel pipe portion 10 having a seam portion 5 formed by electric resistance welding, and a coating portion 11 of zinc phosphate covering at least the outer surface side of the steel pipe portion 10. A part of the coating portion 11 that is immediately above the seam portion 5 and has a width W along the pipe circumferential direction of greater than or equal to 0.1 times the wall thickness and less than or equal to the wall thickness is a color difference portion 20 having a visually identifiable color difference from the other portion, which is outside of the width W in the pipe circumferential direction. The color difference portion 20 is, as described hereafter, provided by applying larger reduction to the coating portion 11 over the bead cut portion larger reduction during cold drawing to generate a difference in color from the other portion. Owing to the presence of the color difference portion 20, in the electric resistance welded steel pipe 100 having an identifiable seam portion according to the present invention, the position of the seam portion 5 on the pipe outer surface side can be easily identified by visual observation.

A preferred manufacturing method for obtaining the electric resistance welded steel pipe 100 is as follows. That such a manufacturing method includes rounding a steel strip in a width direction by roll forming while continuously feeding the steel strip, joining both ends of the rounded steel strip in the width direction by electric resistance welding to make a steel pipe having a seam portion formed by the joining, and cutting an inner surface bead and an outer surface bead of the steel pipe (the electric resistance welded pipe making process), applying coating of zinc phosphate to at least an outer surface of the steel pipe, and performing a drawing process of subjecting the steel pipe to cold drawing using a plug and a die.

The coating of zinc phosphate is applied as lubricating coating for the cold drawing.

Figure 2:
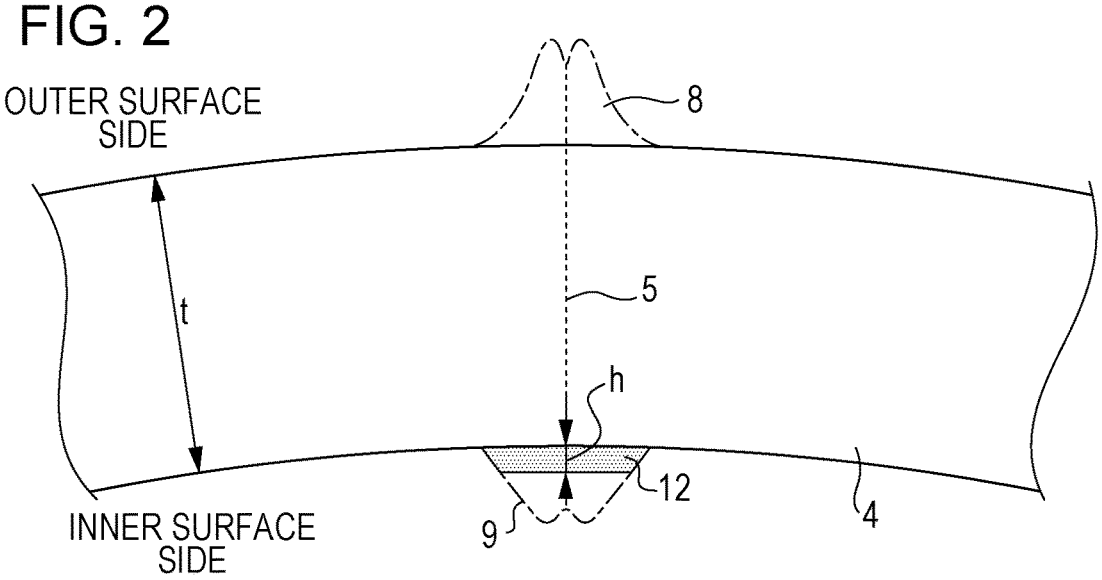
FIG. 2 is a schematic sectional view of the vicinity of a seam portion after the inner and outer surface bead cutting showing an example of a method for manufacturing an electric resistance welded steel pipe having an identifiable seam portion according to the present invention.
Figure 3:
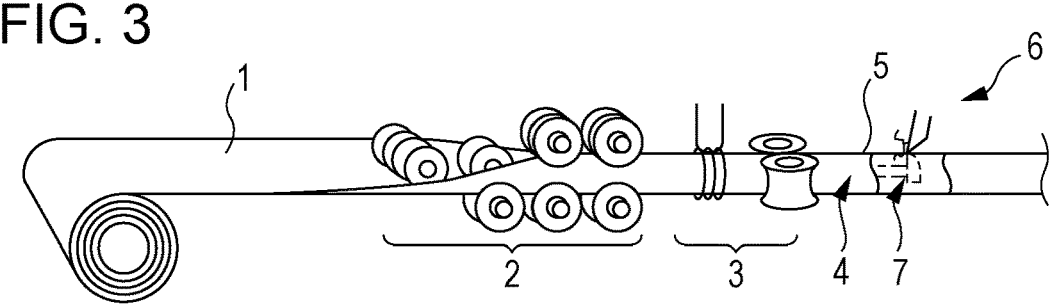
FIG. 3 is a schematic view showing an example of an electric resistance welded pipe making process.

A preferred manufacturing method for obtaining the electric resistance welded steel pipe 100 is further characterized in that, for example as shown in FIG. 2, when the cutting of the inner surface bead and the outer surface bead cutting is applied on a steel pipe (a steel pipe that becomes a steel pipe portion 10 after the drawing process), a part of the inner surface bead 9 and the whole of the outer surface bead 8 are cut to leave an uncut portion in the inner surface bead 9 so that the protrusion height h of the uncut protrusion portion 12 would be greater than or equal to α times and less than or equal to β times the wall thickness t of the non-bead portion of the steel pipe (here, α=0.07, and β=1.7). Instead, a part of the outer surface bead and the whole of the inner surface bead 9 may be cut to leave an uncut portion in the outer surface bead so that the protrusion height h of the uncut protrusion portion would be greater than or equal to α times and less than or equal to β times the wall thickness t of the non-bead portion of the steel pipe.

Thus, in the cold drawing using a die and a plug, the thickness reduction rate in a portion where the protrusion portion 12 is located in the pipe circumferential direction is higher than in the other portion in the pipe circumferential direction. Therefore, coating of zinc phosphate applied to at least the outer surface of the steel pipes 4 (coating that becomes the coating portion 11 in FIG. 1 after the drawing process) is subjected to larger reduction.

As a result, as shown in FIG. 1, a portion of the coating portion 11, which is immediately above the seam portion 5 and has a width W along a pipe circumferential direction of greater than or equal to 0.1 times the wall thickness and less than or equal to the wall thickness, undergoes larger reduction and thereby becomes a color difference portion 20 having a visually identifiable color difference from the other portion, which is outside of the width W in the pipe circumferential direction. Application of a high pressure reduces the roughness of the pipe surface and generates a color difference from the surroundings, and in addition, the width W of greater than or equal to 0.1 times the wall thickness and less than or equal to the wall thickness ensures the visibility of the seam portion. Thus the width W in the pipe circumferential direction becomes the color difference portion 20.

However, when the protrusion height h of the protrusion portion 12 is less than α times the wall thickness t of the non-bead portion, the effect of generating the color difference portion 20 in the drawing process is poor. Further, when the protrusion height h of the protrusion portion 12 is greater than β times the wall thickness t of the non-bead portion, it is difficult to subject the pipe to cold drawing, and it is difficult to generate the color difference portion 20. Accordingly, the protrusion height h of the protrusion portion 12 should be greater than or equal to α times and less than or equal to β times the wall thickness t of the non-bead portion. The control of such a protrusion height h can be performed by adjusting a position of blade height of a cutting tool that is used for the cutting of the inner surface bead or the outer surface bead.

Moreover, the thickness of the coating of zinc phosphate applied before cold drawing may be within a common range of, for example, 1 to 30 μm. The method of applying the coating is immersion in a zinc phosphate bath.

In the above electric resistance welded pipe making process, after cutting the inner surface bead and the outer surface bead and before performing the drawing process, the seam portion 5 may, if necessary, be subjected to heat treatment (referred to as "seam annealing") with a seam annealer (not shown), which is an apparatus that heats only the seam portion 5, by, for example, a high-frequency induction heating method).

EXAMPLES

A steel pipe 4 was manufactured by the above electric resistance welded pipe making process. In this manufacturing, cutting of the inner surface bead and the outer surface bead is per in such a manner as to cut the whole of the outer surface bead 8 and a part of the inner surface bead 9 to leave an uncut portion in the inner surface bead 9. By adjusting blade height position of a cutting tool for cutting the inner surface bead, the protrusion height h of the protrusion portion 12 that was left uncut was varied as shown in Table 1.

After cutting the inner surface bead and the outer surface bead, the seam annealing was performed to obtain a steel pipe having a pipe size before drawing process shown in Table 1. The wall thickness t in this pipe size before drawing process is the wall thickness t of the non-bead portion.

A steel pipe obtained through the electric resistance welded pipe making process was subjected to the cold drawing using a plug and a die. At this time, the coating application thickness, which is the thickness of the zinc phosphate coating applied to the outer surface of the steel pipe 4, and the pipe size after drawing process were as shown Table 1. The coating of zinc phosphate was formed by immersing the steel pipe before being subjected to cold drawing in a zinc phosphate bath.

A coating portion 11 of the outer surface of the product pipe made by cold drawing was visually observed to determine whether the seam portion identification by the color difference portion 20 is possible or not. The results are shown in Table 1. Here, ○ in the seam portion identification column indicates that the identification was possible, and x indicates that the identification was impossible.

The color difference portion 20 was visually determined (it can be visually identified since it is whiter than its surroundings). The width W in the pipe circumferential direction was measured with a vernier caliper.

As shown in Table 1, in the inventive examples in which (the height h of the protrusion portion of the inner surface bead that is left uncut)/(the wall thickness t of the non-bead portion) was greater than or equal to α (=0.07) and less than or equal to β (=1.7), the color difference portion 20 appeared to have the width W in the pipe axis direction as shown in Table 1, and the identification of the seam portion 5 was possible. In contrast, in a comparative example in which the protrusion height h of the protrusion portion 12 was too small (h/t is less than α), the color difference portion 20 did not appear, and, in another comparative example in which the protrusion height h is too large (h/t is greater than β), it was not possible to insert the plug into the inside of the pipe and to perform cold drawing (indicated as "drawing not possible" in the column of pipe size after drawing process), and the color difference portion 20 did not appear. In both comparative examples, the identification of the seam portion was impossible.

TABLE 1

| No. | Pipe size (mm) before drawing process (outer diameter × wall thickness; wall thickness = wall thickness t of non-bead portion) | Protrusion height (mm) of inner surface bead | h/t | Coating application thickness (μm) | Pipe size (mm) after drawing process (outer diameter × wall thickness) | Width W (mm) of color difference portion 20 in pipe circumferential direction | Seam portion identification | Remarks |
|---|---|---|---|---|---|---|---|---|
| 1 | 60.5 × 3.0 | 0.3 | 0.10 | 5 | 48.4 × 2.5 | 2.5 | ○ | Inventive example |
| 2 | 25.4 × 4.0 | 0.3 | 0.08 | 5 | 20.0 × 3.3 | 1.0 | ○ | Inventive example |
| 3 | 89.1 × 7.5 | 2.0 | 0.27 | 8 | 75.0 × 5.6 | 3.5 | ○ | Inventive example |
| 4 | 101.6 × 10.2 | 1.0 | 0.10 | 15 | 91.0 × 9.0 | 5.0 | ○ | Inventive example |

TABLE 1-continued

| No. | Pipe size (mm) before drawing process (outer diameter × wall thickness; wall thickness = wall thickness t of non-bead portion) | Protrusion height (mm) of inner surface bead | h/t | Coating application thickness (μm) | Pipe size (mm) after drawing process (outer diameter × wall thickness) | Width W (mm) of color difference portion 20 in pipe circumferential direction | Seam portion identification | Remarks |
|---|---|---|---|---|---|---|---|---|
| 5 | 60.5 × 3.0 | 0 | 0 | 5 | 48.4 × 2.5 | No color difference portion 20 | x | Comparative example |
| 6 | 89.0 × 7.5 | 13.5 | 1.8 | — | Drawing not possible. | No color difference portion 20 | x | Comparative example |
| 7 | 89.1 × 7.5 | 3.0 | 0.4 | 8 | 75.0 × 5.6 | 3.5 | ○ | Inventive example |
| 8 | 45.0 × 2.0 | 0.6 | 0.3 | 15 | 39.0 × 1.7 | 2.0 | ○ | Inventive example |

REFERENCE SIGNS LIST

1 steel strip
2 roll forming
3 electric resistance welding
4 steel pipe (steel pipe having a seam portion formed by electric resistance welding)
5 seam portion
6 outer surface bead cutting
7 inner surface bead cutting
8 outer surface bead
9 inner surface bead
10 steel pipe portion
11 coating portion (coating portion of zinc: phosphate)
12 protrusion portion (portion of the inner surface bead that is left uncut)
20 color difference portion
100 electric resistance welded steel pipe having an identifiable seam portion

The invention claimed is:

1. A method for manufacturing an electric resistance welded steel pipe, the method comprising:
   rounding a steel strip in a width direction by roll forming while continuously feeding the steel strip;
   joining both ends of the rounded steel strip in the width direction by electric resistance welding to make a steel pipe having a seam portion formed by the joining;
   cutting an inner surface bead and an outer surface bead of the steel pipe in such a manner so as to cut: (i) a whole of the outer surface bead and a part of the inner surface bead to leave an uncut portion in the inner surface bead, or (ii) a whole of the inner surface bead and a part of the outer surface bead to leave an uncut portion in the outer surface bead;
   wherein the cutting of the inner surface bead and the outer surface bead is performed so that a protrusion of the uncut portion has a protrusion height h of greater than or equal to 0.07 times and less than or equal to 1.7 times a wall thickness t of a non-bead portion of the steel pipe;
   applying coating of zinc phosphate to at least an outer surface of the steel pipe to form a coating portion; and
   subjecting the steel pipe to cold drawing using a plug and a die, wherein in the steel pipe that has been subjected to the cold drawing process:
   a part of the coating portion located immediately above the seam portion forms a color difference portion, and
   the color difference portion has a visually identifiable color difference from other parts of the coating portion.

2. The method of claim 1, wherein the cutting of the inner surface bead and the outer surface bead of the steel pipe cuts a whole of the outer surface bead and a part of the inner surface bead to leave an uncut portion in the inner surface bead.

3. The method of claim 1, wherein the color difference portion is whiter than the other parts of the coating portion.

4. The method of claim 1, wherein the color difference portion has a width W along a pipe circumferential direction of greater than or equal to 0.1 times the wall thickness of the steel pipe and less than or equal to the wall thickness of the steel pipe.

5. The method of claim 1, wherein a thickness of the coating of zinc phosphate is in a range of from 1 to 30 μm.

6. The method of claim 1, wherein the application of the coating of zinc phosphate includes immersing the steel pipe in a zinc phosphate bath.

7. The method of claim 1, further comprising, after the cutting of the inner surface bead and the outer surface bead of the steel pipe, heating the seam portion.

* * * * *